United States Patent
Wang et al.

(10) Patent No.: US 11,002,562 B2
(45) Date of Patent: May 11, 2021

(54) ENCODER USING A MAGNETIC SENSING ASSEMBLY AND AN OPTICAL SENSING ASSEMBLY AND POSITION DETECTION METHOD FOR A MOTOR

(71) Applicant: DELTA ELECTRONICS, INC., Taoyuan (TW)

(72) Inventors: Horng-Jou Wang, Taoyuan (TW); Jeng-Ping Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 174 days.

(21) Appl. No.: 16/387,116

(22) Filed: Apr. 17, 2019

(65) Prior Publication Data

US 2020/0064155 A1 Feb. 27, 2020

(30) Foreign Application Priority Data

Aug. 27, 2018 (CN) .......................... 201810981187.6

(51) Int. Cl.
*G01D 5/12* (2006.01)
*G01D 5/347* (2006.01)

(52) U.S. Cl.
CPC ............. *G01D 5/12* (2013.01); *G01D 5/3473* (2013.01); *G01D 5/34715* (2013.01)

(58) Field of Classification Search
CPC .... G01D 5/12; G01D 5/3473; G01D 5/34715; G01D 5/145; G01D 5/34
See application file for complete search history.

(56) References Cited

U.S. PATENT DOCUMENTS

| 7,220,960 | B2 * | 5/2007 | Ito ...................... G01D 5/34715 250/231.13 |
| 2008/0197838 | A1 * | 8/2008 | Fischer ................ G01D 5/2451 324/207.25 |
| 2012/0205527 | A1 * | 8/2012 | Yoshida ............. G01D 5/34792 250/231.1 |
| 2015/0354992 | A1 * | 12/2015 | Murokita ........... G01D 5/34715 318/640 |
| 2016/0209241 | A1 * | 7/2016 | Mitsuhashi ........ G01D 5/34715 |

FOREIGN PATENT DOCUMENTS

| CN | 102636199 A | 8/2012 |
| CN | 204988306 U | 1/2016 |
| JP | 2009186229 A | 8/2009 |
| JP | 2010066129 A | 3/2010 |

(Continued)

*Primary Examiner* — Jennifer D Bennett
(74) *Attorney, Agent, or Firm* — Kirton McConkie; Evan R. Witt

(57) ABSTRACT

An encoder includes a magnet, an optical coded disc, a magnetic sensing assembly, an optical sensing assembly and a signal processing unit. The optical coded disc has a first incremental pattern track and a second incremental pattern track. The magnet and the optical coded disc are structurally coaxial and rotatable. The magnet sensing assembly senses the magnet rotation to obtain an absolute position signal. The optical sensing assembly senses the optical coded disc rotation to obtain a first incremental position signal and a second incremental position signal. The signal processing unit receives and integrates those signals to obtain a high precision absolute position information.

12 Claims, 12 Drawing Sheets

(56) References Cited

FOREIGN PATENT DOCUMENTS

| JP | 2011257166 A | 12/2011 |
|---|---|---|
| JP | 2014013163 A | 1/2014 |
| JP | 2015090305 A | 5/2015 |
| JP | 2016057215 A | 4/2016 |
| TW | M542763 U | 6/2017 |

* cited by examiner

ENCODER USING A MAGNETIC SENSING ASSEMBLY AND AN OPTICAL SENSING ASSEMBLY AND POSITION DETECTION METHOD FOR A MOTOR

FIELD OF THE INVENTION

The present disclosure relates to an encoder, and more particularly to an encoder and a position detection method thereof that obtain high precision absolute position information through obtaining absolute position signals and incremental position signals by a magnetic sensing assembly and an optical sensing assembly and integrating those signals.

BACKGROUND OF THE INVENTION

With the advancement of technology, the encoder technology is widely used in the field of precision instrument control such as rotating speed measurement and position detection of motors. For example, the absolute encoder can be used to detect the number of rotations, rotation direction and rotation position of the motor.

Conventionally, Gray code or M-code (also called maximum length sequence or m-sequence code) is used by the optical encoder to obtain information of the absolute position. The main architecture of the optical encoder includes a light emitter, a light receiver, a coded disc and a processing circuit. The light emitter and the light receiver of the reflective optical encoder are disposed on the same side relative to the coded disc, and the desired signal output is obtained by appropriately designing the patterns on the coded disc.

However, since the conventional encoder architecture and encoding method are very sensitive to the positional deviation between sensor and coded disc, the encoder needs to be extremely accurate in the assembling and aligning process of sensor and coded disc. Furthermore, as the precision requirement of the encoder is increased, the area of the corresponding optical sensing region of the light receiver is also greatly reduced, so that the pollution of the external environment such as oil, dirt or microparticles will seriously affect the sensing of the absolute position signal.

For overcoming the drawbacks of the conventional technologies, there is a need of providing an improved encoder and a position detection method thereof to achieve high precision absolute position sensing, obtain higher resistance ability to environmental pollution, improve the robustness of the encoder, be easy for assembling and make the encoder thinner are important issues in the field.

SUMMARY OF THE INVENTION

An object of the present disclosure provides an encoder and a position detection method thereof to address the issues encountered by the prior arts.

In accordance with an aspect of the present disclosure, there is provided an encoder and a position detection method thereof. By obtaining the absolute position signal, the first incremental position signal and the second incremental position signal through the magnetic sensing assembly and the optical sensing assembly, and integrating through the signal processing unit, a high precision absolute position sensing can be achieved, and a high precision absolute position information is obtained.

In accordance with another aspect of the present disclosure, there is provided an encoder and a position detection method thereof. Through the optical reflective architecture that the light-emitting element and the light-receiving element of the optical sensing assembly are disposed to one side of the optical coded disc, along with the disposal of magnetic sensing assembly and the magnet, the thinning of the encoder can be achieved.

In accordance with another aspect of the present disclosure, there is provided an encoder and a position detection method thereof. By obtaining the absolute position signal through the magnetic sensing assembly, the encoder has high resistance ability to environmental pollution. Furthermore, the optical sensing assembly has incremental light-receiving regions and sensing patterns disposed in a phased-array arrangement, so that the robustness of the encoder is enhanced.

In accordance with another aspect of the present disclosure, there is provided an encoder and a position detection method thereof. Center of the magnetic sensing assembly can be on the rotation axis or offset from the rotation axis, thereby allowing the encoder to have a large production and assembly margin, such that the encoder can be easy for assembling.

In an embodiment, the encoder includes a carrier disc, a magnet, an optical coded disc, a housing, a circuit board, a magnetic sensing assembly, an optical sensing assembly and a signal processing unit. The magnet is disposed on the carrier disc. The optical coded disc is disposed on the carrier disc, and the optical coded disc surrounds the magnet. The optical coded disc has a first incremental pattern track and a second incremental pattern track, and the first incremental pattern track and the second incremental pattern track are respectively arranged along a circumferential direction of the optical coded disc. The carrier disc, the magnet and the optical coded disc are structurally coaxial about a rotation axis and rotatable. The housing surrounds the carrier disc, and the carrier disc, the magnet and the optical coded disc could move with respect to the housing. The circuit board is disposed on the housing. The magnetic sensing assembly is disposed on the circuit board and paired with the magnet, in order to perform magnetic sensing and obtain an absolute position signal when the magnet moves with respect to the housing. The optical sensing assembly is disposed on the circuit board and paired with the optical coded disc having the first incremental pattern track and the second incremental pattern track, in order to perform optical sensing and obtain a first incremental position signal and a second incremental position signal when the optical coded disc moves with respect to the housing. The signal processing unit is disposed on the circuit board. The signal processing unit receives and integrates the absolute position signal, the first incremental position signal and the second incremental position signal to obtain an absolute position information.

In an embodiment, the position detection method of the encoder includes steps of: (a) providing the encoder, wherein the encoder comprises a magnet, an optical coded disc, a magnetic sensing assembly and an optical sensing assembly, wherein the optical coded disc surrounds the magnet and has a first incremental pattern track and a second incremental pattern track, which are respectively arranged along a circumferential direction of the optical coded disc, the magnetic sensing assembly is disposed in pair with the magnet, and the optical sensing assembly is disposed in pair with the optical coded disc; (b) performing magnetic sensing with the magnetic sensing assembly and the magnet when the magnet moves with respect to the magnetic sensing assembly, and obtaining an absolute position signal having one period per one revolution of the magnet; (c) performing optical sensing with the optical sensing assembly and the optical coded disc when the optical coded disc moves with respect to the optical sensing assembly, and obtaining a first incremental position signal having M periods per one revolution of the optical coded disc and a second incremental position signal having N periods per one revolution of the optical coded disc, wherein M and N are integers; (d) analyzing the absolute position signal, the first incremental position signal and the second incremental position signal, and obtaining a preliminary absolute position information, a first incremental position information and a second incremental position information, respectively; (e) analyzing the preliminary absolute position information to obtain a first position; (f) analyzing the first position and the first incremental position information to obtain the second position; and (g) analyzing the second position and the second incremental position information to obtain the third position, which is an absolute position.

In an embodiment, the position detection method of the encoder includes steps of: (a) providing the encoder, wherein the encoder comprises a magnet, an optical coded disc, a magnetic sensing assembly and an optical sensing assembly, wherein the optical coded disc surrounds the magnet and has a first incremental pattern track and a second incremental pattern track, which are respectively arranged along a circumferential direction of the optical coded disc, the magnetic sensing assembly is disposed in pair with the magnet, and the optical sensing assembly is disposed in pair with the optical coded disc; (b) performing magnetic sensing with the magnetic sensing assembly and the magnet when the magnet moves with respect to the magnetic sensing assembly, and obtaining an absolute position signal having one period per one revolution of the magnet; (c) performing optical sensing with the optical sensing assembly and the optical coded disc when the optical coded disc moves with respect to the optical sensing assembly, and obtaining a first incremental position signal having M periods per one revolution of the optical coded disc and a second incremental position signal having N periods per one revolution of the optical coded disc, wherein M and N are integers, and N is larger than M; (d) analyzing the absolute position signal, the first incremental position signal and the second incremental position signal, and obtaining a preliminary absolute position information, a first incremental position information and a second incremental position information, respectively; (e) analyzing the first incremental position information and the second incremental position information, and obtaining a third incremental position information having (N-M) periods per one revolution of the optical coded disc; (f) analyzing the preliminary absolute position information to obtain a first position; (g) analyzing the first position and the third incremental position information to obtain the second position; and (h) analyzing the second position and the second incremental position information to obtain the third position, which is an absolute position.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
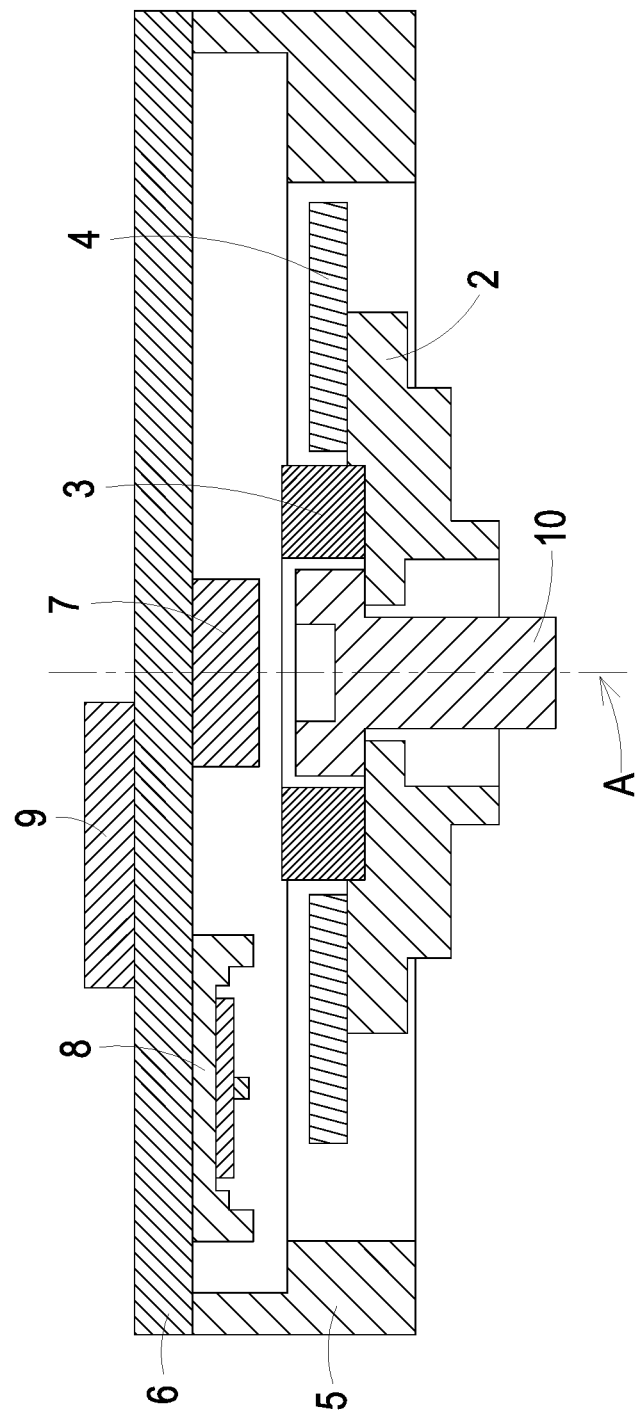
FIG. 1 schematically illustrates the cross-sectional structure of an encoder according to an embodiment of the present disclosure.
Figure 2:
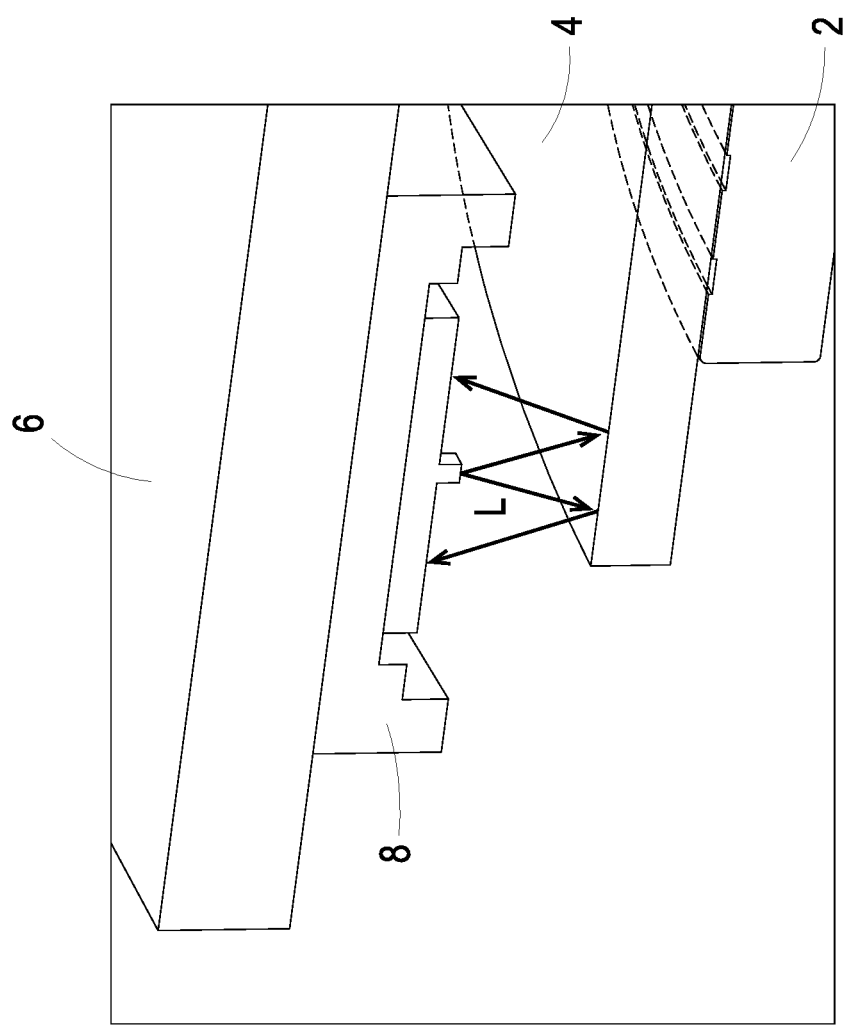
FIG. 2 schematically illustrates the partial structure of an encoder according to an embodiment of the present disclosure.
Figure 3B:
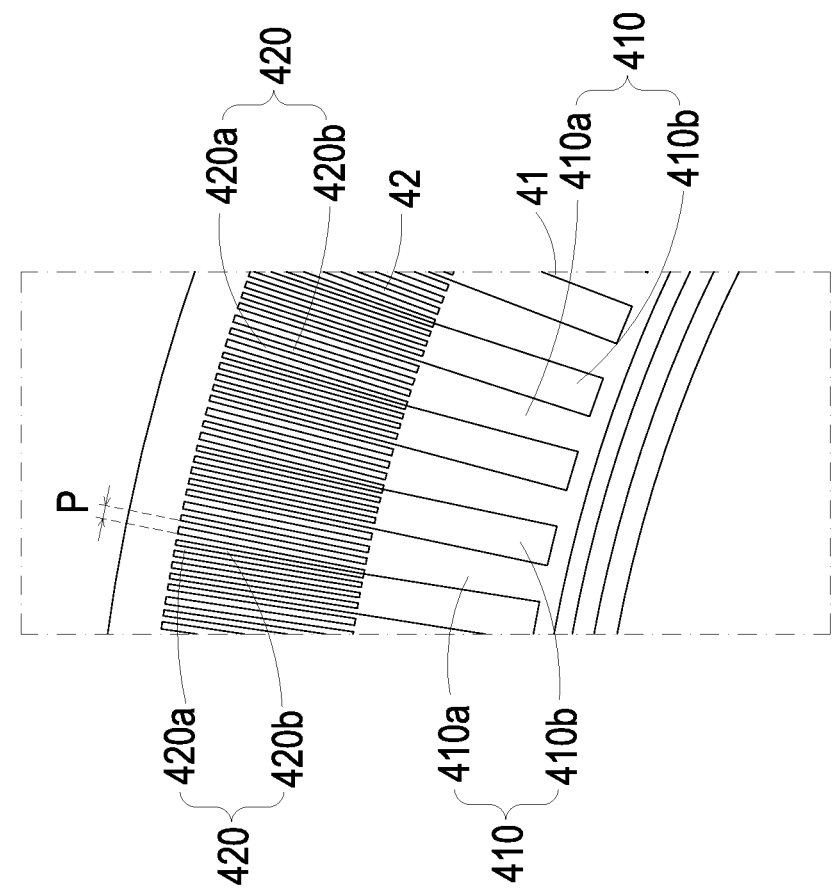
FIG. 3B schematically illustrates the partially enlarged and detailed structure of the optical coded disc as shown in FIG. 3A.
Figure 3A:
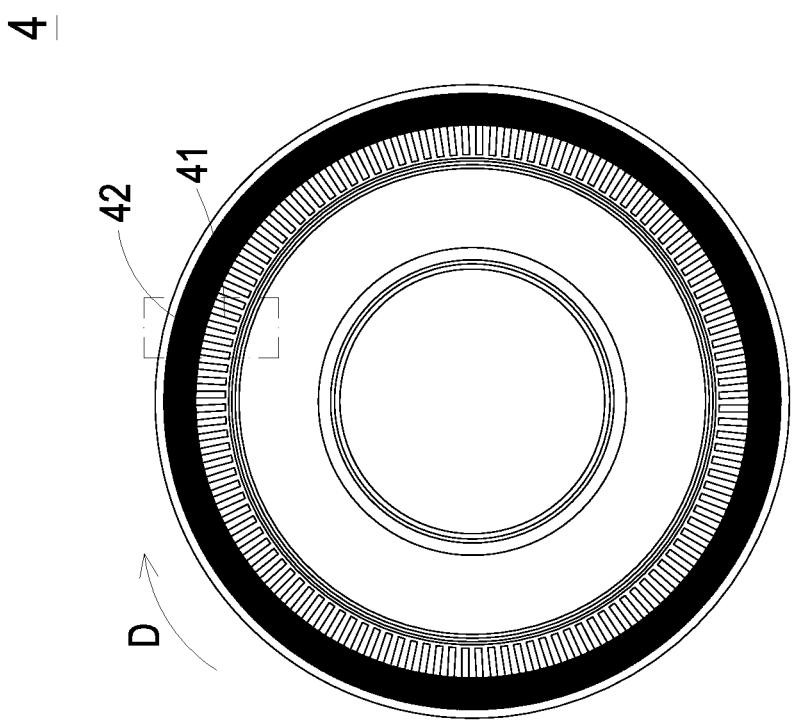
FIG. 3A schematically illustrates the structure of the optical coded disc of the encoder according to an embodiment of the present disclosure.

Please refer to FIG. 1, FIG. 2, FIG. 3A and FIG. 3B. FIG. 1 schematically illustrates the cross-sectional structure of an encoder according to an embodiment of the present disclosure. FIG. 2 schematically illustrates the partial structure of an encoder according to an embodiment of the present disclosure. FIG. 3A schematically illustrates the structure of the optical coded disc of the encoder according to an embodiment of the present disclosure. FIG. 3B schematically illustrates the partially enlarged and detailed structure of the optical coded disc as shown in FIG. 3A. As shown in FIG. 1, FIG. 2, FIG. 3A and FIG. 3B, the encoder 1 of the present disclosure includes a carrier disc 2, a magnet 3, an optical coded disc 4, a housing 5, a circuit board 6, a magnetic sensing assembly 7, an optical sensing assembly 8 and a signal processing unit 9. The magnet 3 is disposed on the carrier disc 2. The optical coded disc 4 is disposed on the carrier disc 2, and the optical coded disc 4 surrounds the magnet 3. The optical coded disc 4 has a first incremental pattern track 41 and a second incremental pattern track 42, and the first incremental pattern track 41 and the second incremental pattern track 42 are adjacently arranged along a circumferential direction D of the optical coded disc 4, respectively. The carrier disc 2, the magnet 3 and the optical coded disc 4 are structurally coaxial about a rotation axis A and are rotatable.

The housing 5 surrounds the carrier disc 2, and the carrier disc 2, the magnet 3 and the optical coded disc 4 could move with respect to the housing 5. The circuit board 6 is disposed on the housing 5 and disposed relative to the magnet 3 and the optical coded disc 4. The magnetic sensing assembly 7 is disposed on the circuit board 6 and paired with the magnet 3, in order to perform magnetic sensing and obtain an absolute position signal when the magnet 3 moves with respect to the housing 5, that is, when the magnet 3 moves with respect to the magnetic sensing assembly 7. The optical sensing assembly 8 is disposed on the circuit board 6 and paired with the optical coded disc 4 having the first incremental pattern track 41 and the second incremental pattern track 42 on one side of the optical coded disc 4, in order to perform optical sensing and obtain a first incremental position signal and a second incremental position signal respectively when the optical coded disc 4 moves with respect to the housing 5, that is, when the optical coded disc 4 moves with respect to the optical sensing assembly 8. The signal processing unit 9 is disposed on the circuit board 6, for example but not limited to, and disposed on the other side different from where the magnetic sensing assembly 7 and optical sensing assembly 8 are disposed. The signal processing unit 9 receives the absolute position signal, the first incremental position signal and the second incremental position signal, and after integrating and processing those signals, a high precision absolute position information is obtained.

In other words, in the encoder of the present disclosure, by obtaining the absolute position signal, the first incremental position signal and the second incremental position signal through the magnetic sensing assembly and the optical sensing assembly, and integrating and processing through the signal processing unit, a high precision absolute position sensing can be achieved, and a high precision absolute position information is obtained.

Figure 4B:
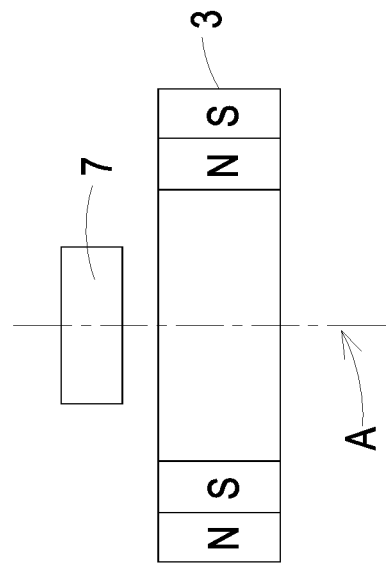
FIG. 4B schematically illustrates the cross-sectional side view of the magnet and the magnetic sensing assembly of the encoder according to an embodiment of the present disclosure.
Figure 4A:
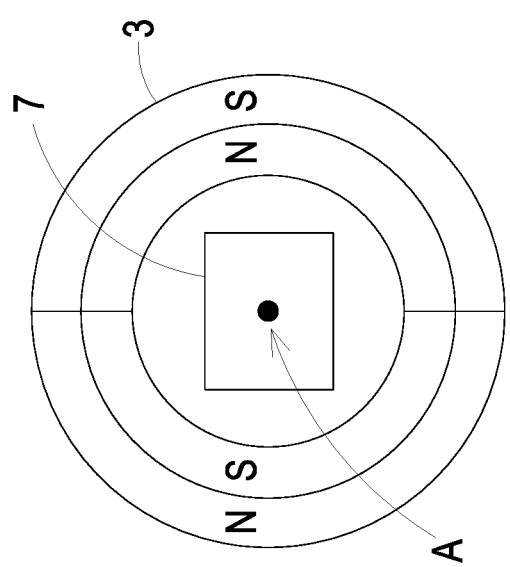
FIG. 4A schematically illustrates the top view of the magnet and the magnetic sensing assembly of the encoder according to an embodiment of the present disclosure.

Please refer to FIG. 1, FIG. 4A and FIG. 4B. FIG. 4A schematically illustrates the top view of the magnet and the magnetic sensing assembly of the encoder according to an embodiment of the present disclosure. FIG. 4B schematically illustrates the cross-sectional side view of the magnet and the magnetic sensing assembly of the encoder according to an embodiment of the present disclosure. As shown in FIG. 1, FIG. 4A and FIG. 4B, in some embodiments, center of the magnetic sensing assembly 7 is on the rotation axis A (i.e., on-axis arrangement). When the magnet 3 is rotated for one revolution about the rotation axis A, at the position of the magnetic sensing assembly 7, the magnetic characteristics are correspondingly changed for a period. This can be the change of the strength of the magnetic flux density, but not limited herein. The magnetic sensing assembly 7 senses the change of the magnetic characteristic and converts it into an electrical signal, so that an absolute position signal having one full period per one revolution is generated and defined for providing to the signal processing unit 9. In some embodiments, the magnet 10 can be a ring-shaped magnet, and the locking screw 10 is penetrated through the magnet 3 and the carrier disc 2 for fixing, but not limited herein.

Figure 5B:
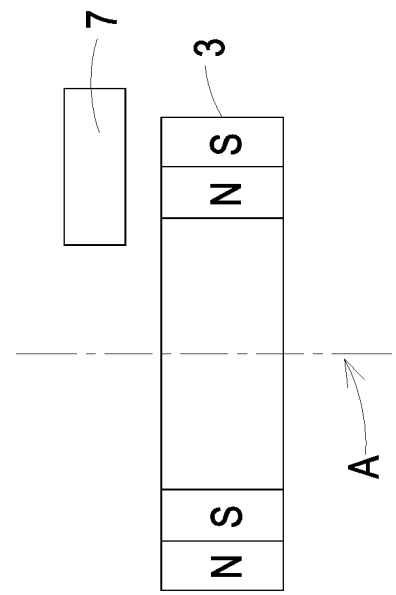
FIG. 5B schematically illustrates the cross-sectional side view of the magnet and the magnetic sensing assembly of the encoder according to another embodiment of the present disclosure.
Figure 5A:
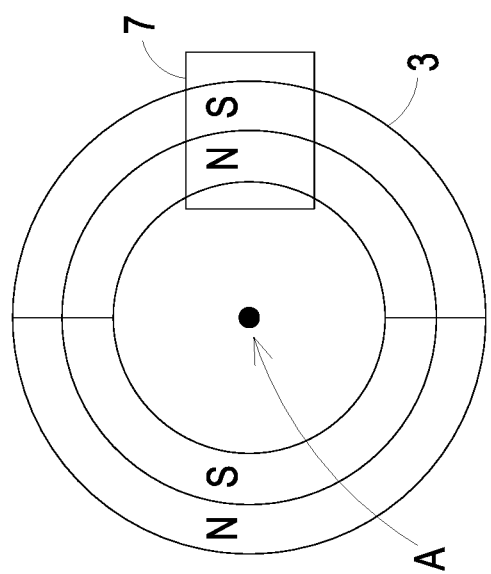
FIG. 5A schematically illustrates the top view of the magnet and the magnetic sensing assembly of the encoder according to another embodiment of the present disclosure.

Please refer to FIG. 1, FIG. 5A and FIG. 5B. FIG. 5A schematically illustrates the top view of the magnet and the magnetic sensing assembly of the encoder according to another embodiment of the present disclosure. FIG. 5B schematically illustrates the cross-sectional side view of the magnet and the magnetic sensing assembly of the encoder according to another embodiment of the present disclosure. As shown in FIG. 1, FIG. 5A and FIG. 5B, in some embodiments, center of the magnetic sensing assembly 7 is offset from the rotation axis A (i.e., off-axis arrangement), so as to sense the change of magnetic characteristics, and an absolute position signal having one full period per one revolution is generated and defined, too. In some embodiments, the magnet 10 can be a ring-shaped magnet, and the hollow ring-shaped encoder architecture can be achieved when the magnetic sensing component 7 is arranged as off-axis, but not limited herein. In some embodiments, the magnet 10 can be a hollow ring-shaped magnet, a circular plate-type magnet or a rectangular-shaped magnet. As long as the magnetic characteristics are correspondingly changed for one period in response to one revolution, the type of the magnet 10 is not restricted. In some embodiments, the magnetic sensing assembly 7 includes a magnetoresistance element (not shown). The magnetoresistance element can be a Hall effect element, an anisotropic magnetoresistance element (AMR element), a giant magnetoresistance element (GMR element), a tunneling magnetoresistance element (TMR element) or integrated circuit elements using the above described elements.

That is to say, in the encoder of the present disclosure, center of the magnetic sensing assembly can be on the rotation axis or offset from the rotation axis, thereby allowing the encoder to have a large production and assembling margin, such that the encoder can be easy for assembly.

Figure 6B:
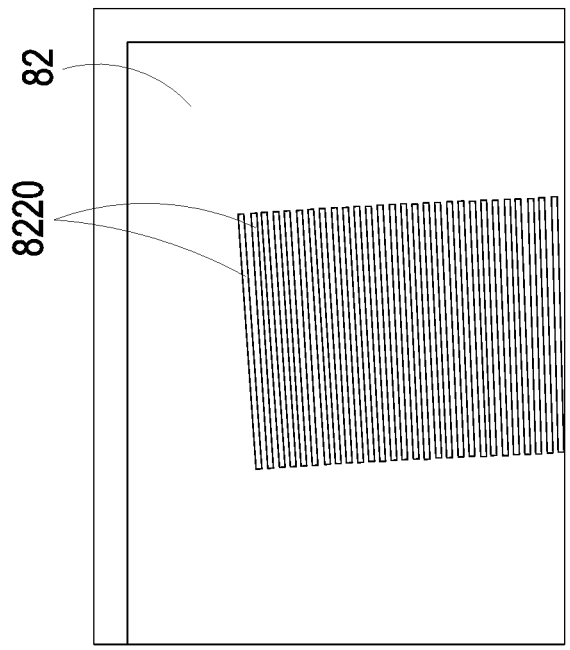
FIG. 6B schematically illustrates the partially enlarged and detailed structure of the optical sensing assembly as shown in FIG. 6A.
Figure 6A:
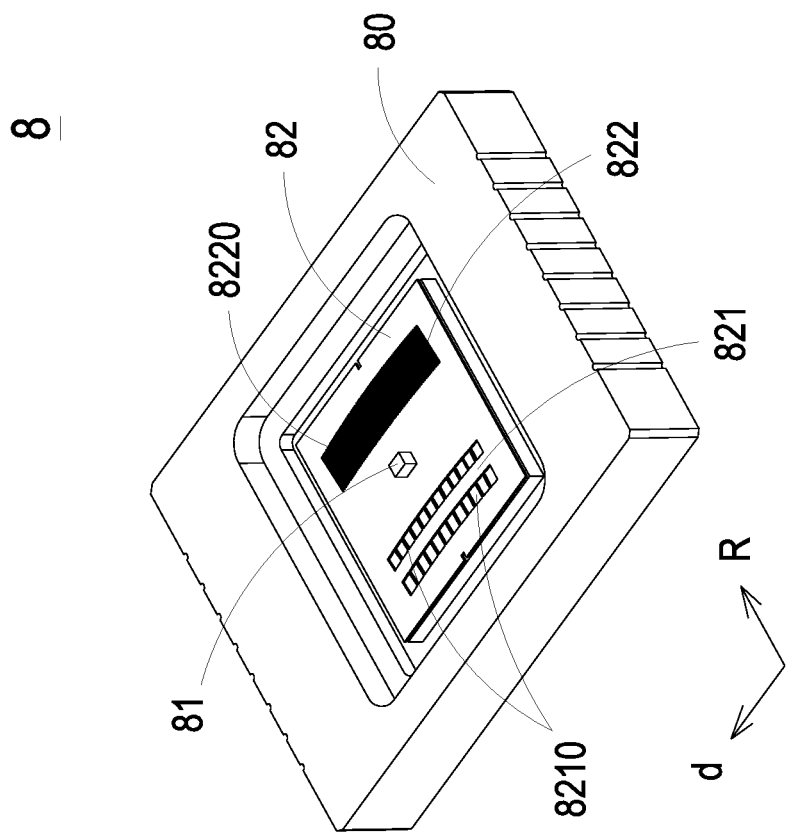
FIG. 6A schematically illustrates the structure of the optical sensing assembly of the encoder according to an embodiment of the present disclosure.
Figure 7A:
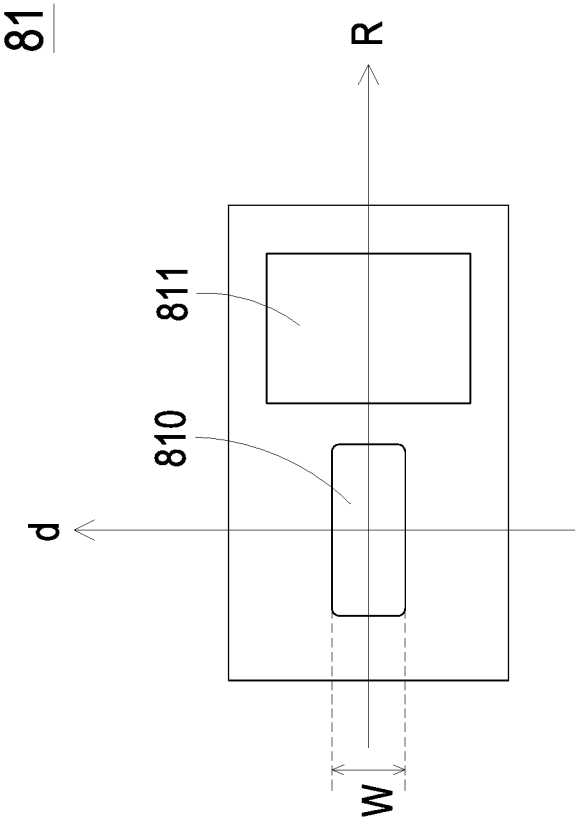
FIG. 7A schematically illustrates the architecture of the light-emitting element of the optical sensing assembly of the encoder according to an embodiment of the present disclosure.
Figure 7B:
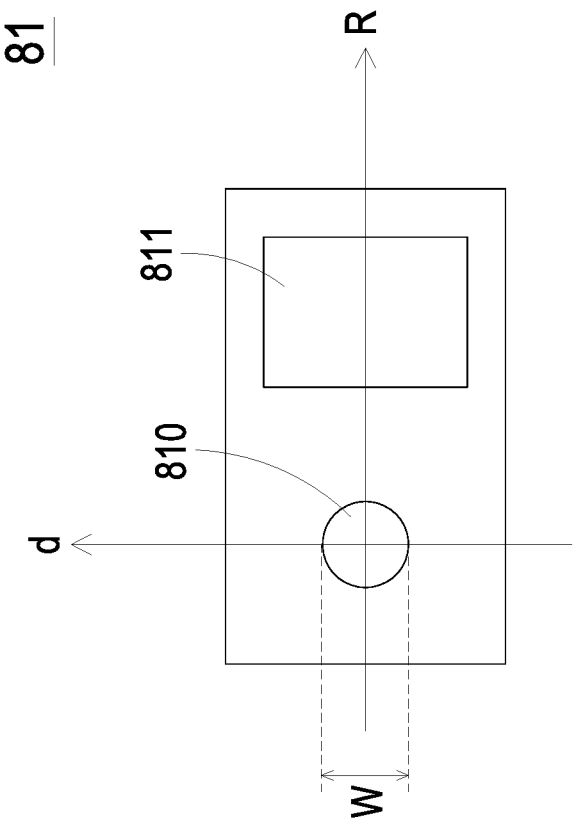
FIG. 7B schematically illustrates the architecture of the light-emitting element of the optical sensing assembly of the encoder according to another embodiment of the present disclosure.
Figure 8B:
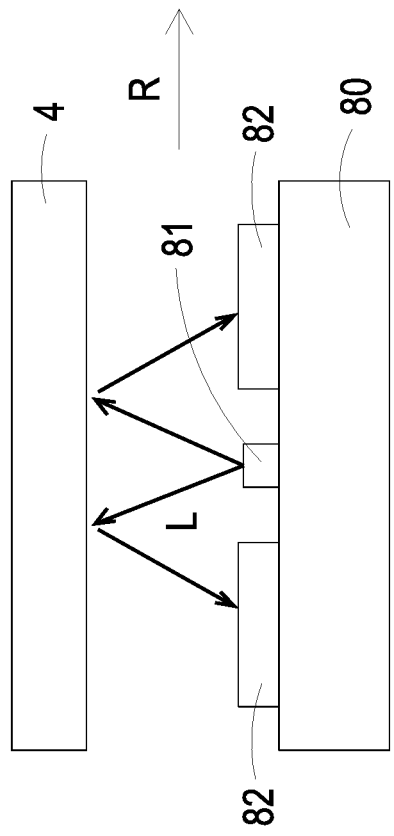
FIG. 8B schematically illustrates the architecture of the optical coded disc and the optical sensing assembly of the encoder according to another embodiment of the present disclosure.
Figure 8A:
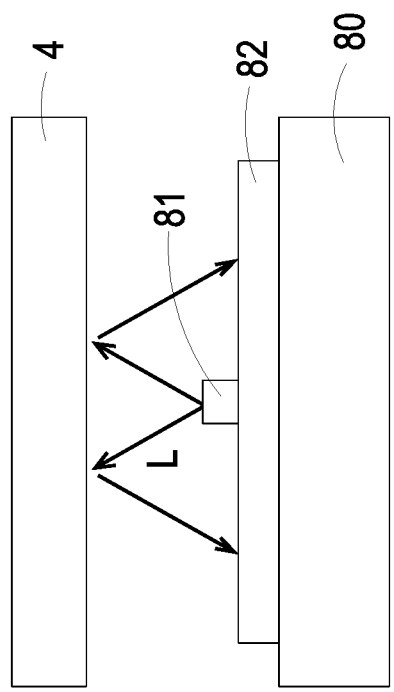
FIG. 8A schematically illustrates the architecture of the optical coded disc and the optical sensing assembly of the encoder according to an embodiment of the present disclosure.

Please refer to FIG. 1, FIG. 2, FIG. 3A, FIG. 3B, FIG. 6A, FIG. 6B, FIG. 7A, FIG. 7B, FIG. 8A and FIG. 8B. FIG. 6A schematically illustrates the structure of the optical sensing assembly of the encoder according to an embodiment of the present disclosure. FIG. 6B schematically illustrates the partially enlarged and detailed structure of the optical sensing assembly as shown in FIG. 6A. FIG. 7A schematically illustrates the architecture of the light-emitting element of the optical sensing assembly of the encoder according to an embodiment of the present disclosure. FIG. 7B schematically illustrates the architecture of the light-emitting element of the optical sensing assembly of the encoder according to another embodiment of the present disclosure. FIG. 8A schematically illustrates the architecture of the optical coded disc and the optical sensing assembly of the encoder according to an embodiment of the present disclosure. FIG. 8B schematically illustrates the architecture of the optical coded disc and the optical sensing assembly of the encoder according to another embodiment of the present disclosure. As shown in FIG. 1, FIG. 2, FIG. 3A, FIG. 3B, FIG. 6A, FIG. 6B, FIG. 7A, FIG. 7B, FIG. 8A and FIG. 8B, in some embodiments, the first incremental pattern track 41 is looped for one revolution (i.e., the mechanical angle from 0 to 360 degrees) along the circumferential direction D of the optical coded disc 4, and the first incremental pattern track 41 has M first incremental patterns 410. The second incremental pattern track 42 is looped for one revolution along the circumferential direction D of the optical coded disc 4, and the second incremental pattern track 42 has N second incremental patterns 420, among which N and M are integers, and N is greater than M. Furthermore, each of the first incremental patterns 410 has a low reflection coefficient region 410a and a high reflection coefficient region 410b, and each of the second incremental patterns 420 has a low reflection coefficient region 420a and a high reflection coefficient region 420b. In some embodiments, the optical coded disc 4 can be made of glass materials, metal materials, plastic materials or any material which can be processed to produce alternate patterns of the optical low reflection coefficient and high reflection coefficient, but not limited herein.

In some embodiments, the optical sensing assembly 8 includes a light-emitting element 81 and at least one light-receiving element 82. The light-emitting element 81 includes, but is not limited to, a light-emitting diode (LED), a vertical-cavity surface-emitting laser (VCSEL) or a laser diode (LD). The light-receiving element 82 has a first incremental light-receiving region 821 and a second incremental light-receiving region 822. The first incremental light-receiving region 821 and the second incremental light-receiving region 822 are disposed along the radial direction R of the optical coded disc 4, and are on both sides of the light-emitting element 81, respectively. The light-emitting element 81 emits a light L to the first incremental pattern track 41 and the second incremental pattern track 42. The first incremental light-receiving region 821 receives the light L reflected by the high reflection coefficient region 410b of the first incremental pattern track 41 to obtain the first incremental position signal, and the second incremental light-receiving region 822 receives the light L reflected by the high reflection coefficient region 420b of the second incremental pattern track 42 to obtain the second incremental position signal. That is to say, the light L emitted by the light-emitting element 81 is reflected by the corresponding first incremental pattern track 41 and second incremental pattern track 42, and forming an intensity distribution of lighting energy on a plane of the light-receiving element 82. Furthermore, the light-receiving element 82 senses the change of the intensity distribution of the lighting energy, converts it into an electrical signal, and generates the first incremental position signal and the second incremental position signal, respectively. The generated signals are provided to the signal processing unit 9 for signal integration and processing.

For example, the light-emitting element 81 and the light-receiving element 82 are disposed on the same side with respect to the optical coded disc 4, and the light-receiving element 82 has a first incremental light-receiving region 821 and a second incremental light-receiving region 822 on both sides of the light-emitting element 81 along the radial direction R of the optical coded disc 4, respectively. The first incremental light-receiving region 821 continuously senses the reflected light L from the first incremental pattern track 41 having M first incremental patterns 410 of the optical coded disc 4, and the sensed change of the intensity distribution of the lighting energy is converted into an electrical signal, which is a first incremental position signal having M periods per one revolution of the optical coded disc 4. Similarly, the second incremental light-receiving region 822 continuously senses the reflected light L from the second incremental pattern track 42 having N second incremental patterns 420 of the optical coded disc 4, and the sensed change of the intensity distribution of the light energy is converted into an electrical signal, which is a second incremental position signal having N period per one revolution of the optical coded disc 4.

In some embodiments, the light-emitting element 81 has a light-emitting region 810 and an electrode 811. The shape of the light-emitting region 810 can be, for example but not limited to, a circle, a rectangle or an ellipse. The light-emitting region 810 has a width W in a circumferential tangent direction d of the optical coded disc 4, the second incremental pattern 420 has a pitch P in the circumferential tangent direction d, and the width W is 0.5 to 1.5 times of the pitch P (i.e., $0.5P \leq W \leq 1.5P$), thereby obtaining the second incremental position signal with good signal quality.

In some embodiments, the light-emitting element 81 and the light-receiving element 82 can be, for example but not limited to, directly disposed on the circuit board 6. In some embodiments, as shown is FIG. 8A, the optical sensing assembly 8 includes a substrate 80, a light-emitting element 81, and a light-receiving element 82. The substrate 80 is disposed on the circuit board 6, the light-receiving element 82 is disposed on the substrate 80, and the light-emitting element 81 is disposed on the light-receiving element 82. That is to say, the substrate 80, the light-receiving element 82 and the light-emitting element 81 are sequentially stacked, but not limited herein. In some embodiments, as shown in FIG. 8B, the optical sensing assembly 8 includes a substrate 80, a light-emitting element 81 and two light-receiving elements 82. The substrate 80 is disposed on the circuit board 6, and the light-emitting element 81 and the two light-receiving elements 82 are disposed on the substrate 80. Furthermore, the two light-receiving elements 82 are respectively disposed on both sides of the light-emitting element 81, one of the light-receiving elements 82 has the first incremental light-receiving region 821, and the other one of the light-receiving elements 82 has the second incremental light-receiving region 822. In addition, the height of the light-emitting element 81 is the same as the heights of each of the two light-receiving elements 82, but not limited herein.

In some embodiments, the first incremental light-receiving region 821 has a plurality of first sensing patterns 8210, and the second incremental light-receiving region 822 has a plurality of second sensing patterns 8220. The plurality of first sensing patterns 8210 and the plurality of second sensing patterns 8220 are respectively disposed in a phased-array arrangement. For example, the arrangement of the sensing patterns can be an arrangement in sequence of alternating and repeated periods of A+, B+, A− and B−, and the electrical angle differences of the generated B+, A− and B− signals with respect to the A+ signal are 90°, 180° and 270°, respectively. The phased-array arrangement has high oil and dirt resistance ability and the equalization effect on the non-uniform distribution of the received lighting energy, such that the robustness of the encoder 1 of the present disclosure is further enhanced.

In other words, in the encoder and the position detection method thereof of the present disclosure, through the optical reflective architecture that the light-emitting element and the light-receiving element of the optical sensing assembly are disposed to one side of the optical coded disc, along with the disposal of magnetic sensing assembly and the magnet, the thinning of the encoder can be achieved. In addition, by obtaining the absolute position signal through the magnetic sensing assembly, the encoder has high resistance ability to environmental pollution. Furthermore, the optical sensing assembly has incremental light-receiving regions and sensing patterns disposed in a phased-array arrangement, so that the robustness of the encoder is enhanced.

Figure 9:
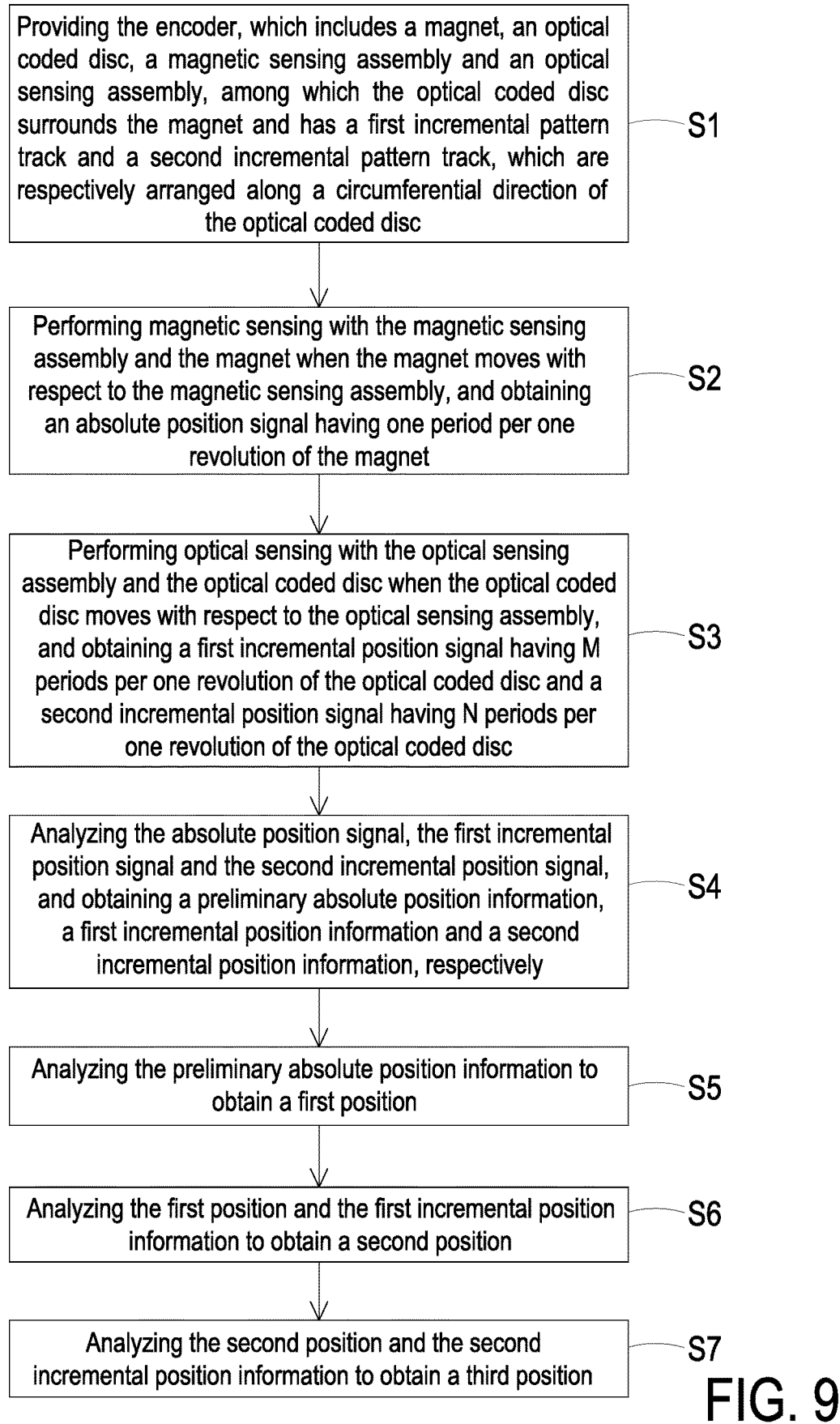
FIG. 9 schematically illustrates the flow chart of a position detection method of the encoder according to an embodiment of the present disclosure.
Figure 10:
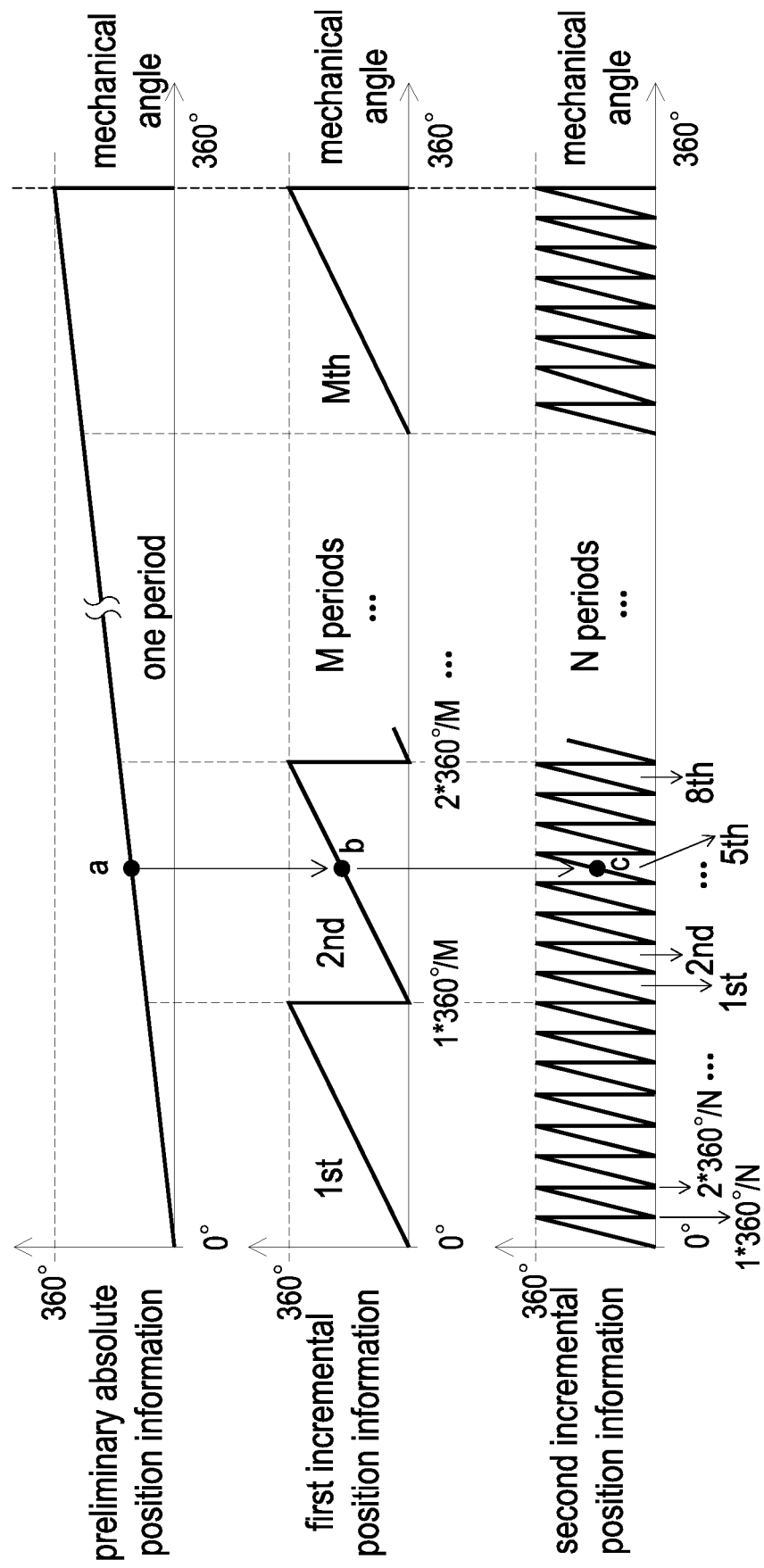
FIG. 10 schematically illustrates the position information obtained through the position detection method of the encoder according to an embodiment of the present disclosure.

Please refer to FIG. 1, FIG. 2, FIG. 3A, FIG. 9 and FIG. 10. FIG. 9 schematically illustrates the flow chart of a position detection method of the encoder according to an embodiment of the present disclosure. FIG. 10 schematically illustrates the position information obtained through the position detection method of the encoder according to an embodiment of the present disclosure. As shown in FIG. 1, FIG. 2, FIG. 3A, FIG. 9 and FIG. 10, the position detection method of the encoder of an embodiment of the present disclosure includes steps as follows. Firstly, as shown in a step S1, an encoder 1 is provided, and the encoder 1 includes a magnet 3, an optical coded disc 4, a magnetic sensing assembly 7 and an optical sensing assembly 8. The optical coded disc 4 surrounds the magnet 3 and has a first incremental pattern track 41 and a second incremental pattern track 42, which are respectively arranged along a circumferential direction D of the optical coded disc 4. The magnetic sensing assembly 7 is disposed in pair with the magnet 3, and the optical sensing assembly 8 is disposed in pair with the optical coded disc 4. Then, in a step S2, the magnetic sensing is performed with the magnetic sensing assembly 7 and the magnet 3 when the magnet 3 moves with respect to the magnetic sensing assembly 7, and an absolute position signal having one period per one revolution of the magnet 3 is obtained. Next, as shown in a step S3, the optical sensing is performed with the optical sensing assembly 8 and the optical coded disc 4 when the optical coded disc 4 moves with respect to the optical sensing assembly 8, and a first incremental position signal having M periods per one revolution of the optical coded disc 4 and a second incremental position signal having N periods per one revolution of the optical coded disc 4 are obtained, among which M and N are integers, M can be 16, 32, 64 or 128, and N can be 256, 512, 1024, 2048, 4096 or 8192, but not limited herein.

Then, as shown in a step S4, the absolute position signal, the first incremental position signal and the second incremental position signal are analyzed, and a preliminary absolute position information, a first incremental position information and a second incremental position information are obtained, respectively. The absolute position signal, which has one period per one revolution, provided by the magnetic sensing assembly 7, is converted and defined as the preliminary absolute position information by the signal processing unit 9. The preliminary absolute position information has one period of electrical angle from 0 to 360 degrees in the mechanical angle range from 0 to 360 degrees, that is, the preliminary absolute position information has one period of electrical angle from 0 to 360 degrees when the magnet 3 rotates one revolution with respect to the magnetic sensing assembly 7. The first incremental position signal, which has M periods per one revolution, provided by the optical sensing assembly 8, is converted as the first incremental position information by the signal processing unit 9. The first incremental position information has M periods of electrical angle from 0 to 360 degrees in the mechanical angle range from 0 to 360 degrees, that is, the first incremental position information has M periods of electrical angle from 0 to 360 degrees when the optical coded disk 4 rotates one revolution with respect to the optical sensing assembly 8. Similarly, the second incremental position signal, which has N periods per one revolution, provided by the optical sensing assembly 8, is converted as the second incremental position information by the signal processing unit 9. The second incremental position information has N periods of electrical angle from 0 to 360 degrees in the mechanical angle range from 0 to 360 degrees, that is, the second incremental position information has N periods of electrical angle from 0 to 360 degrees when the optical coded disk 4 rotates one revolution with respect to the optical sensing assembly 8.

Next, as shown in a step S5, a first position, an initial and rough position of the carrier disc, a, is obtained from the preliminary absolute position information, and please also refer to FIG. 10. Then, as shown in a step S6, the first position a and the first incremental position information are analyzed to obtain a second position b. That is to say, the first position a is used to find out the related period number position of the first incremental position information, for example, the 2nd period number position as shown in FIG. 10, and then the second position b is obtained by analyzing the first incremental position information. The absolute position with medium precision is obtained by the second position b and the related period number position in the first incremental position information. Next, as shown in a step S7, the second position b and the second incremental position information are analyzed to obtain a third position c. That is to say, the second position b is used to find out the related period number position of the second incremental position information, for example, the 5th period number position as shown in FIG. 10, and then the third position c is obtained by analyzing the second incremental position information. The absolute position with high precision is obtained by the third position c and the related period number position in the second incremental position information. The step S4, the step S5, the step S6 and the step S7 described above are implemented by a signal processing unit 9. In this kind of progressive position analysis steps, the absolute position with lower precision, with medium precision and with high precision are found out sequentially and finally the absolute position with high precision is obtained.

Figure 11:
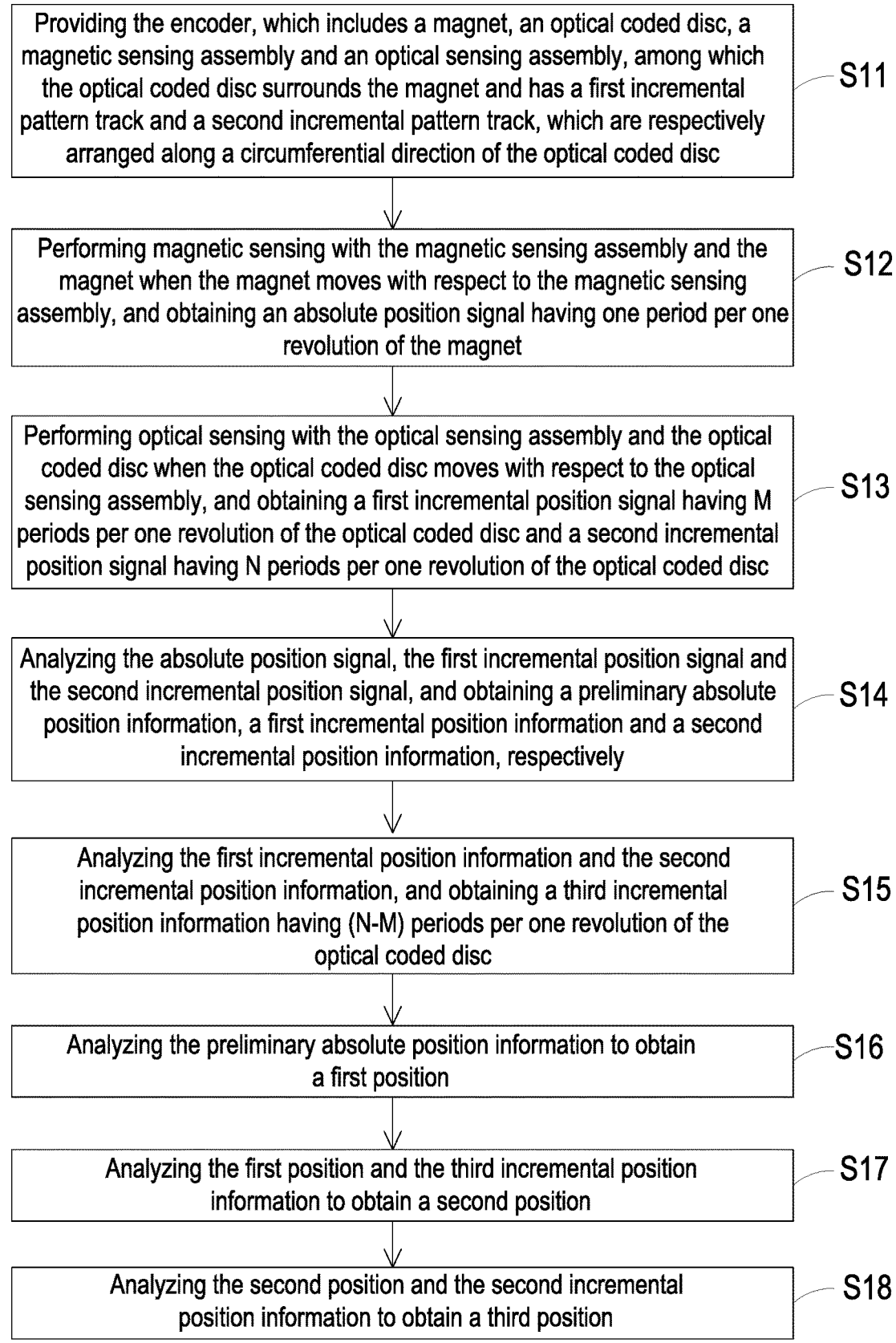
FIG. 11 schematically illustrates the flow chart of a position detection method of the encoder according to another embodiment of the present disclosure.
Figure 12:
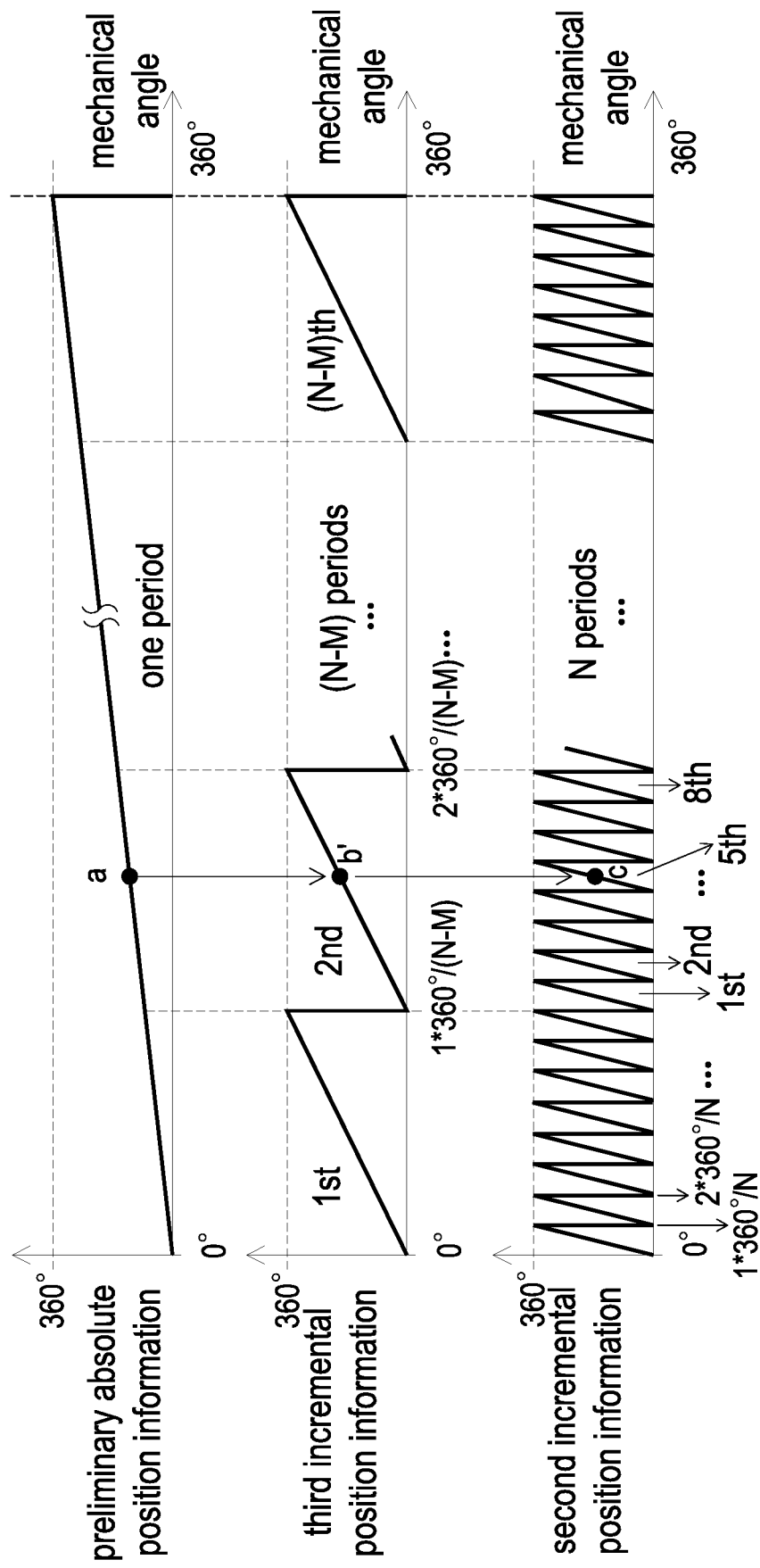
FIG. 12 schematically illustrates the position information obtained through the position detection method of the encoder according to another embodiment of the present disclosure.

Please refer to FIG. 1, FIG. 2, FIG. 3A, FIG. 11 and FIG. 12. FIG. 11 schematically illustrates the flow chart of a position detection method of the encoder according to another embodiment of the present disclosure. FIG. 12 schematically illustrates the position information obtained through the position detection method of the encoder according to another embodiment of the present disclosure. As shown in FIG. 1, FIG. 2, FIG. 3A, FIG. 11 and FIG. 12, the position detection method of the encoder of an embodiment of the present disclosure includes steps as follows. Firstly, as shown in a step S11, an encoder 1 is provided, and the encoder 1 includes a magnet 3, an optical coded disc 4, a magnetic sensing assembly 7 and an optical sensing assembly 8. The optical coded disc 4 surrounds the magnet 3 and has a first incremental pattern track 41 and a second incremental pattern track 42, which are respectively arranged along a circumferential direction D of the optical coded disc 4. The magnetic sensing assembly 7 is disposed in pair with the magnet 3, and the optical sensing assembly 8 is disposed in pair with the optical coded disc 4. Then, in a step S12, the magnetic sensing is performed with the magnetic sensing assembly 7 and the magnet 3 when the magnet 3 moves with respect to the magnetic sensing assembly 7, and an absolute position signal having one period per one revolution of the magnet 3 is obtained. Next, as shown in a step S13, the optical sensing is performed with the optical sensing assembly 8 and the optical coded disc 4 when the optical coded disc 4 moves with respect to the optical sensing assembly 8, and a first incremental position signal having M periods per one revolution of the optical coded disc 4 and a second incremental position signal having N periods per one revolution of the optical coded disc 4 are obtained, among which M and N are integers, and N is larger than M. Furthermore, N can be 256, 512, 1024, 2048, 4096 or 8192, and (N-M) is 16, 32, 64 or 128, but not limited herein.

Then, as shown in a step S14, the absolute position signal, the first incremental position signal and the second incremental position signal are analyzed, and a preliminary absolute position information, a first incremental position information and a second incremental position information are obtained, respectively. Next, as shown in a step S15, the first incremental position information and the second incremental position information are analyzed, and a third incremental position information having (N-M) periods per one revolution of the optical coded disc 4 is obtained.

Then, as shown in a step S16, a first position, an initial and rough position of the carrier disc, a, is obtained from the preliminary absolute position information, and please also refer to FIG. 12. Then, as shown in a step S17, the first position a and the third incremental position information are analyzed to obtain a second position b'. That is to say, the first position a is used to find out the related period number position of the third incremental position information, for example, the 2nd period number position as shown in FIG. 12, and then the second position b' is obtained by analyzing the third incremental position information. The absolute position with medium precision is obtained by the second position b' and the related period number position in the third incremental position information. Next, as shown in a step S18, the second position b' and the second incremental position information are analyzed to obtain a third position c. That is to say, the second position b' is used to find out the related period number position of the second incremental position information, for example, the 5th period number position as shown in FIG. 12, and then the third position c is obtained by analyzing the second incremental position information. The absolute position with high precision is obtained by the third position c and the related period number position in the second incremental position information. The step S14, the step S15, the step S16, the step S17 and the step S18 described above are implemented by a signal processing unit 9.

Therefore, by making the patterned feature size of the first incremental pattern track 41 close to the patterned feature size of the second incremental pattern track 42, that is, the optical feature sizes of the two signal tracks 41, 42 are close, the difficulty of the optical design is reduced, and the precision of the encoder 1 is further improved.

From the above descriptions, the present disclosure provides an encoder and a position detection method thereof. By obtaining the absolute position signal, the first incremental position signal and the second incremental position signal through the magnetic sensing assembly and the optical sensing assembly, and integrating through the signal processing unit, a high precision absolute position sensing can be achieved, and a high precision absolute position information is obtained. Furthermore, through the optical reflective architecture that the light-emitting element and the light-receiving element of the optical sensing assembly are disposed to one side of the optical coded disc, along with the disposal of magnetic sensing assembly and the magnet, the thinning of the encoder can be achieved. In addition, by obtaining the absolute position signal through the magnetic sensing assembly, the encoder has high resistance ability to environmental pollution. Furthermore, the optical sensing assembly has incremental light-receiving regions and sensing patterns disposed in a phased-array arrangement, so that the robustness of the encoder is enhanced. Meanwhile, center of the magnetic sensing assembly can be on the rotation axis or offset from the rotation axis, thereby allowing the encoder to have a large production and assembling margin, such that the encoder can be easy for assembling.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An encoder, comprising:
  a carrier disc;
  a magnet disposed on the carrier disc;
  an optical coded disc disposed on the carrier disc and surrounding the magnet, wherein the optical coded disc has a first incremental pattern track and a second incremental pattern track, and the first incremental pattern track and the second incremental pattern track are respectively arranged along a circumferential direction of the optical coded disc, wherein the carrier disc, the magnet and the optical coded disc are structurally coaxial about a rotation axis and rotatable;
  a housing surrounding the carrier disc, wherein the carrier disc, the magnet and the optical coded disc could move with respect to the housing;
  a circuit board disposed on the housing;
  a magnetic sensing assembly disposed on the circuit board and paired with the magnet, in order to perform magnetic sensing and obtain an absolute position signal when the magnet moves with respect to the housing;
  an optical sensing assembly disposed on the circuit board and paired with the optical coded disc having the first incremental pattern track and the second incremental pattern track, in order to perform optical sensing and obtain a first incremental position signal and a second incremental position signal when the optical coded disc moves with respect to the housing; and
  a signal processing unit disposed on the circuit board, wherein the signal processing unit receives and integrates the absolute position signal, the first incremental position signal and the second incremental position signal to obtain an absolute position information,
  wherein the first incremental pattern track has M first incremental as being rotated for one revolution along the circumferential direction of the optical coded disc, and the second incremental pattern track has N second incremental patterns as being rotated for one revolution along the circumferential direction of the optical coded disc, wherein M and N are integers, and N is greater than M, wherein each of the first incremental patterns and the second incremental patterns respectively has a low reflection coefficient region and a high reflection coefficient region, wherein the optical sensing assembly comprises a light-emitting element and at least a light-receiving element, wherein the light-receiving element has a first incremental light-receiving region and a second incremental light-receiving region, and the first incremental light-receiving region and the second increment light-receiving region are on both sides of the light-emitting element respectively, wherein the light-emitting element emits a light to the first incremental pattern track and the second incremental pattern track, wherein the first incremental light-receiving region receives the light reflected by the first incremental pattern track to obtain the first incremental position signal, and the second incremental light-receiving region receives the light reflected by the second incremental pattern track to obtain the second incremental position signal, wherein the light-emitting element has a light-emitting region, wherein the light-emitting region has a width in a circumferential tangent direction of the optical coded disc, the second incremental pattern has a pitch in the circumferential tangent direction, and the width is 0.5 to 1.5 times of pitch.

2. The encoder according to claim 1, wherein center of the magnetic sensing assembly is on the rotation axis.

3. The encoder according to claim 1, wherein center of the magnetic sensing assembly is offset from the rotation axis.

4. The encoder according to claim 1, wherein the magnetic sensing assembly comprises a magnetoresistance element, wherein the magnetoresistance element is a Hall effect element, an anisotropic magnetoresistance element, a giant magnetoresistance element or a tunneling magnetoresistance element.

5. The encoder according to claim 1, wherein the optical sensing assembly further comprises a substrate, wherein the substrate is disposed on the circuit board, the light-receiving element is disposed on the substrate, and the light-emitting element is disposed on the light-receiving element.

6. The encoder according to claim 1, wherein the optical sensing assembly further comprises a substrate, the substrate is disposed on the circuit board, the light-emitting element and a pair of the light-receiving elements are disposed on the substrate, wherein the light-receiving elements are respectively disposed on both sides of the light-emitting element, and each of the light-receiving elements respectively has the first incremental light-receiving region and the second incremental light-receiving region.

7. The encoder according to claim 6, wherein a height of the light-emitting element is flush with heights of each of the two light-receiving elements.

8. The encoder according to claim 1, wherein the first incremental light-receiving region has a plurality of first sensing patterns, and the second incremental light-receiving region has a plurality of second sensing patterns, wherein the plurality of first sensing patterns and the plurality of second sensing patterns are respectively disposed in a phased-array arrangement.

9. A position detection method for a motor, comprising steps of:
(a) providing an encoder, wherein the encoder comprises a magnet, an optical coded disc, a magnetic sensing assembly and an optical sensing assembly, wherein the optical coded disc surrounds the magnet and has a first incremental pattern track and a second incremental pattern track, which are respectively arranged along a circumferential direction of the optical coded disc, the magnetic sensing assembly is disposed in pair with the magnet, and the optical sensing assembly is disposed in pair with the optical coded disc;
(b) performing magnetic sensing with the magnetic sensing assembly and the magnet when the magnet moves with respect to the magnetic sensing assembly, and obtaining an absolute position signal having one period per one revolution of the magnet;
(c) performing optical sensing with the optical sensing assembly and the optical coded disc when the optical coded disc moves with respect to the optical sensing assembly, and obtaining a first incremental position signal having M periods per one revolution of the optical coded disc and a second incremental position signal having N periods per one revolution of the optical coded disc, wherein M and N are integers;
(d) analyzing the absolute position signal, the first incremental position signal and the second incremental position signal, and obtaining a preliminary absolute position information, a first incremental position information and a second incremental position information, respectively;
(e) analyzing the preliminary absolute position information to obtain a first position;
(f) analyzing the first position and the first incremental position information to obtain a second position; and
(g) analyzing the second position and the second incremental position information to obtain a third position, which is an absolute position.

10. The position detection method of the encoder according to claim 9, wherein the step (d), the step (e), the step (f) and the step (g) are implemented by a signal processing unit, M is 16, 32, 64 or 128, and N is 256, 512, 1024, 2048, 4096 or 8192.

11. A position detection method for a motor, comprising steps of:
(a) providing an encoder, wherein the encoder comprises a magnet, an optical coded disc, a magnetic sensing assembly and an optical sensing assembly, wherein the optical coded disc surrounds the magnet and has a first incremental pattern track and a second incremental pattern track, which are respectively arranged along a circumferential direction of the optical coded disc, the magnetic sensing assembly is disposed in pair with the magnet, and the optical sensing assembly is disposed in pair with the optical coded disc;
(b) performing magnetic sensing with the magnetic sensing assembly and the magnet when the magnet moves with respect to the magnetic sensing assembly, and obtaining an absolute position signal having one period per one revolution of the magnet;
(c) performing optical sensing with the optical sensing assembly and the optical coded disc when the optical coded disc moves with respect to the optical sensing assembly, and obtaining a first incremental position signal having M periods per one revolution of the optical coded disc and a second incremental position signal having N periods per one revolution of the optical coded disc, wherein M and N are integers, and N is larger than M;
(d) analyzing the absolute position signal, the first incremental position signal and the second incremental position signal, and obtaining a preliminary absolute position information, a first incremental position information and a second incremental position information, respectively;

(e) analyzing the first incremental position information and the second incremental position information, and obtaining a third incremental position information having N-M periods per one revolution of the optical coded disc;

(f) analyzing the preliminary absolute position information to obtain a first position;

(g) analyzing the first position and the third incremental position information to obtain a second position; and (h) analyzing the second position and the second incremental position information to obtain a third position, which is an absolute position.

12. The position detection method for a motor according to claim 11, wherein the step (d), the step (e), the step (f), the step (g) and the step (h) are implemented by a signal processing unit, N is 256, 512, 1024, 2048, 4096 or 8192, and N-M is 16, 32, 64 or 128.

* * * * *